US007923518B2

(12) United States Patent
Obrecht

(10) Patent No.: US 7,923,518 B2
(45) Date of Patent: Apr. 12, 2011

(54) NITRILE RUBBERS

(75) Inventor: Werner Obrecht, Moers (DE)

(73) Assignee: LANXESS Deutschland GmbH, Lëverkusen (DE)

( * ) Notice: Subject to any disclaimer, the term of this patent is extended or adjusted under 35 U.S.C. 154(b) by 0 days.

(21) Appl. No.: 12/030,953

(22) Filed: Feb. 14, 2008

(65) Prior Publication Data
US 2008/0293889 A1 Nov. 27, 2008

(30) Foreign Application Priority Data

May 22, 2007 (DE) .......................... 10 2007 024 008

(51) Int. Cl.
C08C 1/14 (2006.01)
C08C 1/15 (2006.01)
C08F 2/38 (2006.01)
C08F 2/40 (2006.01)
C08F 2/42 (2006.01)

(52) U.S. Cl. .......... 526/224; 523/335; 524/80; 524/401; 524/423; 524/424; 524/429; 524/436; 524/437; 524/556; 524/560; 524/565; 524/566; 524/804; 524/827; 524/831; 524/832; 524/833; 528/485; 528/487; 528/488; 528/490; 525/329.1; 525/329.2; 525/329.3; 525/330.3; 525/330.4; 525/330.5; 525/331.9; 525/332.5; 525/332.6; 525/332.7; 525/344; 525/374

(58) Field of Classification Search .................. 526/224, 526/341, 342, 335, 338, 340.1, 319; 523/335; 524/80, 401, 423, 424, 429, 436, 437, 556, 524/560, 565, 566, 804, 827, 831, 832, 833; 528/485, 487, 488, 490; 525/329.1, 329.2, 525/329.3, 330.3, 330.4, 330.5, 331.9, 332.5, 525/332.6, 332.7, 344, 374
See application file for complete search history.

(56) References Cited

U.S. PATENT DOCUMENTS

| | | | | |
|---|---|---|---|---|
| 2,468,739 A * | 5/1949 | Eaton et al. | .................. | 568/73 |
| 3,700,637 A | 10/1972 | Finch, Jr. | .................. | 260/83.3 |
| 3,915,909 A | 10/1975 | Schnoring et al. | .......... | 260/17 R |
| 4,464,515 A | 8/1984 | Rempel et al. | .................. | 525/338 |
| 4,503,196 A | 3/1985 | Rempel et al. | .................. | 525/338 |
| 4,536,568 A | 8/1985 | Wunder | .................. | 528/487 |
| 4,581,417 A | 4/1986 | Buding et al. | .................. | 525/338 |
| 4,631,315 A | 12/1986 | Buding et al. | .................. | 525/338 |
| 4,746,707 A | 5/1988 | Fiedler et al. | .................. | 525/338 |
| 4,779,032 A | 10/1988 | Sakaegi et al. | .................. | 318/685 |
| 4,795,788 A | 1/1989 | Himmler et al. | .................. | 525/338 |
| 4,812,528 A | 3/1989 | Rempel et al. | .................. | 525/338 |
| 4,826,721 A | 5/1989 | Obrecht et al. | .................. | 428/252 |
| 4,920,176 A | 4/1990 | Jorgensen, Jr. | .................. | 525/185 |
| 4,978,771 A | 12/1990 | Fiedler et al. | .................. | 558/459 |
| 5,627,250 A * | 5/1997 | Tsuji et al. | .................. | 526/338 |
| 5,683,819 A * | 11/1997 | Mori et al. | .................. | 428/500 |
| 5,703,189 A * | 12/1997 | Tsuji et al. | .................. | 526/338 |
| 5,807,941 A | 9/1998 | Tsuji et al. | .................. | 526/224 |
| 6,683,136 B2 | 1/2004 | Guo et al. | .................. | 525/329.3 |
| 2003/0166789 A1* | 9/2003 | Aimura et al. | .................. | 525/329.1 |
| 2003/0171518 A1 | 9/2003 | Magg et al. | .................. | 526/297 |
| 2003/0236348 A1 | 12/2003 | Wendling et al. | .................. | 524/801 |
| 2008/0293868 A1* | 11/2008 | Obrecht | .................. | 524/439 |
| 2008/0293869 A1* | 11/2008 | Obrecht | .................. | 524/439 |
| 2008/0293902 A1* | 11/2008 | Obrecht et al. | .................. | 526/224 |

FOREIGN PATENT DOCUMENTS

| | | |
|---|---|---|
| DE | 2539 132 | 3/1977 |
| DE | 27 51 786 | 5/1979 |
| DE | 0154 702 | 4/1982 |
| EP | 0 779 300 | 12/1998 |
| EP | 0 692 496 | 1/1999 |
| EP | 0 779 301 | 8/2000 |
| JP | 50-105746 | 8/1975 |
| JP | 51-26790 | 5/1993 |
| JP | 07 316128 | 12/1995 |
| WO | 02/100905 | 12/2002 |
| WO | 05/100941 | 12/2002 |

OTHER PUBLICATIONS

W. Hofmann, Rubber Chem. Technol. 36 (1963) 1, "Vulcanizate Structure, Relaxation, and Tensile Strength of Polyisopresnes" pp. 815-834.
Ullmann's Encyclopedia of Industrial Chemistry, VCH Verlagsgesellschaft, Weinheim, 1993, pp. 255-261, „Rubber, 3. Synthetic.
* Angew. Makromol. Chem. 1986, 145-146, (1986) "Zussammenfassung" and 161-179, Obrecht etl al "Hydrierter Nitrilkautschuk Ein Werkstoff Mit Neun Eigenschaften".
Kolloid-Z. 154, (1957) 154-167, Von H. Wenning, "Elektrolytkoagulation von Buna S3 Latex".
Houben-Weyl (1961), Methoden der Org. Chemie, Makromolekulare Stoffe 1, p. 484, H. R. Kricheldorf: "Pulymerizsation von heterocyclischen Monomeren unter Ringöffnung".
Houben-Weyl (1961), Methoden der Org. Chemie, Makromolekulare Stoffe 1, p. 479 kationische, von P-Heterocyclen.
Ulllmann's Encyclopedia of Industrial Chemistry, 6th Ed., vol. 31, pp. 345-355 "Resins Natural" 5. Rosin (Colophony).
Ullmann's Encyclopedia of Industrial Chemistry, 6th Ed., vol. 13, pp. 75-108 "Fatty Acids".

* cited by examiner

Primary Examiner — Vasu Jagannathan
Assistant Examiner — Richard A Huhn
(74) Attorney, Agent, or Firm — Nicanor A. Kohncke

(57) ABSTRACT

The present application provides novel nitrile rubbers comprising repeating units of at least one $\alpha,\beta$-unsaturated nitrile, at least one conjugated diene and optionally one or more further copolymerizable monomers which nitrile rubbers are distinguished by a specific calcium content as well as a specific chlorine content and dispose of specific thio end groups. Additionally, an improved polymerization and work-up process is provided to produce the aforementioned nitrile rubbers.

36 Claims, No Drawings

NITRILE RUBBERS

FIELD OF THE INVENTION

The invention relates to a nitrile rubber, a process for producing it, vulcanizable mixtures based on this nitrile rubber, also a process for producing vulcanizates from these mixtures and the vulcanizates obtained in this way.

BACKGROUND OF THE INVENTION

For the purposes of the present invention, nitrile rubbers, also referred to as "NBRs" for short, are rubbers which are copolymers or terpolymers of at least one $\alpha,\beta$-unsaturated nitrile, at least one conjugated diene and optionally one or more further copolymerizable monomers.

The storage stability of such nitrile rubbers is frequently problematical. For the present purposes, storage-stable means that the Mooney viscosity as important specification criterion for nitrile rubbers changes very little during prolonged storage times and in particular also at high temperatures as can appear in summer.

Nitrite rubbers and processes for producing such nitrile rubbers are known, see for example, W. Hofmann, Rubber Chem. Technol. 36 (1963) 1 and Ullmann's Encyclopedia of Industrial Chemistry, VCH Verlagsgesellschaft, Weinheim, 1993, pp. 255-261. This publication gives no indication as to whether and if appropriate how the storage stability of nitrile rubbers can be improved.

JP 75,105,746 describes heat-resistant nitrile rubbers which are obtained by carrying out the coagulation of the latex by means of a mixture of tin dichloride and calcium chloride. Here, 50 parts by weight of tin dichloride are used per 100 parts by weight of calcium chloride. The use of tin salts is nowadays problematical for ecological reasons, especially since these tin salts are found in the nitrile rubber even after comprehensive subsequent washing of the nitrile rubber. The removal of the tin salts from the washing water is also associated with a high and therefore likewise undesirable outlay for purification.

It is known from JP 76/26,790 that a nitrile rubber latex can be coagulated using strontium chloride, which results in a coagulated nitrile rubber having a strontium content of 1.2%. It is stated that a moulding produced on the basis of such a nitrile rubber has significantly better properties than a corresponding moulding based on a nitrile rubber obtained from the latex by coagulation using calcium chloride.

According to Angew. Makromol. Chem. 1986, 145-146, 161-179, an extremely effective measure for improving the storage stability of nitrile rubber is selective hydrogenation of the double bonds originating from the butadiene while at the same time retaining the triple bonds of the nitrile groups. The property changes achieved by the hydrogenation are desirable for many applications, but not for all. In addition, the hydrogenation is complicated and requires a series of additional process steps. In addition, the glass transition temperatures are usually made worse compared to unhydrogenated starting material by the hydrogenation. For this reason, hydrogenation is not a suitable solution to the problem for all applications.

NBR is produced by emulsion polymerization, which firstly gives an NBR latex. The NBR solid is isolated from this latex by coagulation. Salts and acids are used for coagulation. In the coagulation of latices by means of metal salts, it is known that significantly larger amounts of electrolyte are required in the case of monovalent metal ions, e.g. in the form of sodium chloride, than in the case of polyvalent metal ions, e.g. in the form of calcium chloride, magnesium chloride or aluminium sulphate (Kolloid-Z. 154, 154 (1957)). It is also known from Houben-Weyl (1961), Methoden der Org. Chemie, Makromolekulare Stoffe 1, p. 484 that the use of polyvalent metal ions leads to "at least some inclusion of the emulsifier in the product". According to Houben-Weyl (1961), Methoden der Org. Chemie, Makromolekulare Stoffe 1, p. 479, "not only do the electrolytes used have to be very carefully washed out again, but the finished product should also he free of the catalysts and emulsifiers of the process batch. Even small amounts of residual electrolytes give turbid and cloudy pressed and injection-moulded parts, impair the electrical properties and increase the water absorption capacity of the finished product" (citation). However, Houben-Weyl gives no indication as to whether and in what way the work-up of the latex influences its storage stability.

DD 154 702 discloses a process for the free-radical copolymerization of butadiene and acrylonitrile in emulsion, which is controlled by means of a specific, advantageously computer-aided metering program for the monomers and the molecular weight regulators, e.g. tert-dodecyl mercaptan, and in which the latices obtained are worked up by coagulation in an acid medium to give the solid rubber. A significant advantage of the process is said to be that the resin soaps and/or fatty acid soaps used as emulsifiers remain in the rubber as a result of the use of acids in the coagulation. i.e. they are not washed out as in the case of other processes. In addition to the advantage of good properties of the NBR, the improvement in the economics of the process and the avoidance of wastewater pollution by washed-out emulsifier are specifically advertised here. It is stated that the butadiene-acrylonitrile copolymers containing 10-30% by weight of acrylonitrile obtained have good elasticity and low-temperature properties combined with an increased swelling resistance and advantageous processability. Measures by means of which the storage stability of the nitrile rubber can be influenced are not revealed by the teachings of this patent.

JP 27902/73 (Appl. 69 32,322) discloses that the use of amines in the coagulation of latices by means of magnesium salts, for example by means of a combination of diethylenetriamine and magnesium chloride, enables the initial vulcanization rate to be reduced and thus the scorch resistance of nitrile rubbers to be improved. However, no information as to how storage-stable nitrile rubbers can be obtained is given.

DE-A 23 32 096 discloses that rubbers can be precipitated from their aqueous dispersions by means of methylcellulose and a water-soluble alkali metal, alkaline earth metal, aluminium or zinc salt. Preference is given to using sodium chloride as water-soluble salt. It is stated that an advantage of this process is that it gives a coagulum which is virtually completely free of extraneous constituents such as emulsifiers, catalysts residues and the like since these extraneous materials are removed together with the water when the coagulum is separated off and any remaining residues are completely washed out by means of further water. Information about the storage stability of rubbers produced in this way is not given. In DE-A 24 25 441, the electrolyte coagulation of rubber latices is carried out using 0.1-10% by weight (based on the rubber) of water-soluble $C_2$-$C_4$ alkylcelluloses or hydroxyalkylcelluloses in combination with from 0.02 to 10% by weight (based on the rubber) of a water-soluble alkali metal, alkaline earth metal, aluminium or zinc salt as auxiliary instead of methylcellulose. Here too, preference is given to using sodium chloride as water-soluble salt. The coagulum is separated off mechanically, optionally washed with water and the remaining water is removed. Here too, it is stated that the extraneous materials are, as in DE-A 23 32 096, essentially completely removed together with the water when the coagulum is separated off and any remaining residues are washed out completely in the washing with further water.

In DE-A 27 51 786, it is established that the precipitation and isolation of rubbers from their aqueous dispersions can be carried out by means of a smaller amount of (hydroxy)alkylcellulose when from 0.02 to 0.25% by weight of a water-soluble calcium salt is used. A further advantage is said to be that this process gives an extremely pure coagulum which is essentially completely free of extraneous constituents such as emulsifiers, catalysts residues and the like. These extraneous materials are removed together with the water when the coagulum is separated off and any remaining residues can be washed out by means of water. It is also stated that the properties of the isolated rubbers are not adversely affected by a calcium salt being used for coagulation. Rather, it is said that a rubber whose vulcanization properties are not impaired and are fully satisfactory is obtained. This is presented as surprising since it is said that impairment of the rubber properties is frequently observed when polymers are precipitated from dispersions by means of polyvalent metal ions such as calcium or aluminium ions. Houben-Weyl (1961), Methoden der Org. Chemie, Makromolekulare Stoffe 1, pp. 484/485, is offered as evidence for the last statement. In contrast, the rubbers of DE-A 27 51 786 display no slowing or worsening of, for example, the initial vulcanization and/or full vulcanization.

None of the documents DE-A 23 32 096, DE-A 24 25 441 and DE-A 27 51 786 disclose which measures have to be taken in order to achieve high storage stability of nitrile rubbers.

As in the case of the above-described patents, the object of DE-A 30 43 688, is also to achieve a large reduction in the amounts of electrolyte required for coagulation of the latex. According to the teachings of DE-A 30 43 688, this is achieved by using either plant-based protein-like materials or polysaccharides such as starch and if appropriate water-soluble polyamine compounds as auxiliaries in addition to the inorganic coagulate in the electrolyte coagulation of latices. As inorganic coagulates, preference is given to alkali metal or alkaline earth metal salts. The specific additives make it possible to achieve a reduction in the amounts of salts used for quantitative coagulation of the latex. DE-A 3 043 688 gives no information as to how an improvement in storage stability can be achieved as a result of the production and/or work-up of the nitrile rubber.

In U.S. Pat. No. 4,920,176, it is stated and evidenced by experimental data that very high sodium, potassium and calcium contents and also emulsifiers remain in the nitrile rubber in coagulation of a nitrile rubber latex by means of inorganic salts such as sodium chloride or calcium chloride. However, this is undesirable and, according to the teachings of U.S. Pat. No. 4,920,176, water-soluble cationic polymers are used instead of inorganic salts in the coagulation of nitrile rubber latices for the purpose of obtaining very pure nitrile rubber. The polymers used here are, for example, ones based on epichlorohydrin and dimethylamine. These auxiliaries are used with the aim of significantly reducing the amounts of salts remaining in the product. The vulcanizates obtained therefrom display lower swelling on storage in water and an increased electrical resistance. In the patent text, the property improvements mentioned are attributed purely qualitatively to the minimal cation contents remaining in the product. A more detailed explanation of the phenomena observed is not given. U.S. Pat. No. 4,920,176 also gives no information as to whether and how the storage stability can be controlled by means of the production and work-up of the nitrile rubber.

The objective of EP-A-1 369 436 is to provide nitrile rubbers having a high purity. The process of EP-A-1 369 436 starts out from typical nitrile rubbers. Nothing is said about the polymerization process except that an emulsion polymerization is carried out in the presence of salts of fatty acids and/or resin acids as emulsifiers. This is followed by coagulation of the latex by means of acids, optionally with addition of precipitants. As acids, it is possible to use all mineral and organic acids which allow the desired pH values to be set. In addition, it is possible to use additional precipitates, with mention being made of alkali metal salts of inorganic acids, e.g. sodium chloride and sodium sulphate, for this purpose. The fatty acids and resin acids formed as a result of the action of acid are subsequently washed out by means of aqueous alkali metal hydroxide solutions and the polymer is finally subjected to shear until a residual moisture content of less than 20% is obtained. As a result of this shearing action, the water or the residual moisture including the ion contents and other foreign substances present therein are removed. The Ca contents of the products disclosed in Examples 1 and 2 are only 4 and 2 ppm, respectively. EP-A-1 369 436 gives no information on the production of nitrile rubbers which display increased storage stability.

EP-A-0 692 496, EP-A-0 779 301 and EP-A-0 779 300 in each case describe nitrile rubbers based on an unsaturated nitrile and a conjugated diene. All the nitrile rubbers contain 10-60% by weight of unsaturated nitrile and have a Mooney viscosity in the range 15-150 or, according to EP-A-0 692 496, in the range 15-65 and all have at least 0.03 mol of $C_{12}$-$C_{16}$-alkylthio group per 100 mol of monomer units, with this alkylthio group having at least three tertiary carbon atoms and a sulphur atom which is bound directly to at least one of the tertiary carbon atoms. The nitrile rubbers are in each case produced in the presence of a $C_{12}$-$C_{16}$-alkyl thiol having a corresponding structure as molecular weight regulator which functions as "chain transfer agent" and is thus incorporated as end group into the polymer chains.

In the case of the nitrile rubbers of EP-A-0 779 300, it is stated that they have a width "ΔAN" (AN=unsaturated nitrile) of the composition distribution of the unsaturated nitrile in the copolymer in the range from 3 to 20. The process for producing them differs from that of EP-A-0 692 496 in that only 30-80% by weight of the total amount of monomers is used at the beginning of the polymerization and the remaining amount of monomers is fed in only at a conversion of the polymerizsation of 20-70% by weight.

In the case of the nitrile rubbers of EP-A-0 779 301, it is stated that they contain 3-20% by weight of a fraction having a low molecular weight and a number average molecular weight $M_n$ of less than 35 000. The process for producing them differs from that of EP-A-0 692 496 in that only 10-95% by weight of the alkyl thiol are mixed into the monomer mixture before the polymerization and the remaining amount of the alkyl thiol is fed in only after a polymerization conversion of 20-70% by weight has been reached.

With regard to the coagulation of the latex, all three patent applications EP-A-0 692 496, EP-A-0 779 301 and EP-A-0 779 300 disclose that any coagulants can be used. As inorganic coagulant, calcium chloride and aluminium chloride are mentioned and used. The focus is on nitrile rubbers which are essentially halogen-free and obtained by carrying out the coagulation of the latex in the presence of a non-ionic surface-active auxiliary and using halogen-free metal salts such as aluminium sulphate, magnesium sulphate and sodium sulphate. Coagulation using aluminium sulphate or magnesium sulphate is said to be preferred The resulting, essentially halogen-free nitrile rubber has a halogen content of not more than 3 ppm.

In Comparative Example 6 of EP-A-779 300 and Comparative Example 7 of EP-A-0 779 301, the coagulation of the latex is carried out using a mixture of NaCl and $CaCl_2$, with the $CaCl_2$ being used in large amounts and the weight ratio of NaCl to $CaCl_2$ being 1:0.75. In respect of the scorching time and the stress at 100% elongation, no significant differences from the other examples shown in the respective Table 12 or 13 are found.

According to EP-A-0 692 496, EP-A-0 779 300 and EP-A-0 779 301, it is essential to use alkyl thiols in the form of the compounds 2,2,4,6,6-pentamethylheptane-4-thiol and 2,2,4,6,6,8,8-heptamethylnonane-4-thiol as molecular weight regulators for the production of the nitrile rubbers. It is clearly pointed out here that the use of the conventional known tert-dodecyl mercaptan as regulator gives nitrile rubbers having poorer properties.

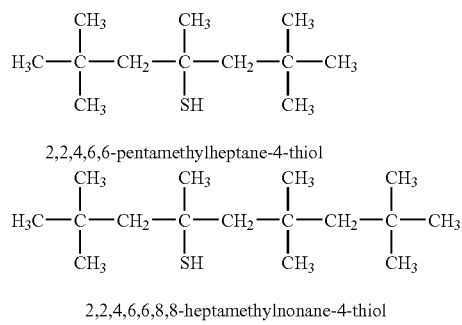

2,2,4,6,6-pentamethylheptane-4-thiol 2,2,4,6,6,8,8-heptamethylnonane-4-thiol

In the case of the nitrile rubbers produced in EP-A-0 692 496, EP-A-0 779 300 and EP-A-0 779 301, it is stated that they have an advantageous property profile, good processability of the rubber mixtures and make low fouling of the mould possible during processing. The vulcanizates obtained are said to have a good combination of low-temperature resistance and oil resistance and possess good mechanical properties. It is also stated that high polymerization conversions of greater than 75%, preferably greater than 80%, in the production of the nitrile rubbers enable a high productivity to be achieved and the vulcanization rate in vulcanization using sulphur or peroxides is high, in particular in the case of NBR grades for injection moulding. It is also indicated that the nitrile rubbers have a short initial vulcanization time and a high crosslinking density. Nothing is said about the property of storage stability in the patent applications mentioned.

In summary, it can be said that no process which makes it possible to synthesize nitrile rubbers which foreseeably have a good storage stability has been described up to now.

SUMMARY OF THE INVENTION

It was therefore an object of the present invention to provide nitrile rubbers which have a good storage stability and at the same time unchanged good processing properties, i.e. a good vulcanization profile.

DETAILED DESCRIPTION OF THE INVENTION

The invention provides a nitrile rubber which contains repeating units of at least one α,β-unsaturated nitrile, at least one conjugated diene and optionally one or more further copolymerizable monomers and
  (i) has a calcium content of at least 150 ppm, based on the nitrile rubber, and a chlorine content of at least 40 ppm, based on the nitrile rubber, and
  (ii) contains 2,2,4,6,6-pentamethylheptane-4-thio and/or 2,4,4,6,6-pentamethylheptane-2-thio and/or 2,3,4,6,6-pentamethylheptane-2-thio and/or 2,3,4,6,6-pentamethylheptane-3-thio end groups.

To determine the calcium content, the following method has been found to be useful and is used for the purposes of the present invention: 0.5 g of the nitrile rubbers are digested by dry ashing at 550° C. in a platinum crucible with subsequent dissolution of the ash in hydrochloric acid. After appropriate dilution of the digestion solution with deionized water, the calcium content is determined by ICP-OES (inductively coupled plasma-optical emission spectrometry) at a wavelength of 317.933 nm against calibration solutions matched to the acid matrix. Depending on the concentration of the elements in the digestion solution or the sensitivity of the measuring instrument used, the concentrations of the sample solutions are matched to the linear range of the calibration for the wavelengths used in each case (B. Welz "Atomic Absorption Spectrometry", 2nd Ed., Verlag Chemie, Weinheim 1985).

The nitrile rubbers of the invention preferably have a calcium content of at least 200 ppm, particularly preferably at least 400 ppm, very particularly preferably more than 500 ppm, in particular at least 600 ppm and especially preferably at least 800 ppm, of calcium, based on the nitrile rubber.

The nitrile rubbers of the invention surprisingly have the desired very good storage stability and at the same time have a positive processing behaviour.

For the purposes of the present invention, the storage stability of a rubber is a very substantial constancy of the molecular weight or the Mooney viscosity over a prolonged period of time, especially at relatively high temperatures, too.

The storage stability is usually determined by storing the unvulcanized nitrile rubber for a defined period of time at elevated temperature (also referred to as hot air storage) and determining the difference between the Mooney viscosities before and after this storage at elevated temperature. Since the Mooney viscosity of nitrile rubber usually increases during hot air storage, the storage stability is characterized by the difference of Mooney viscosity after storage minus Mooney viscosity before storage.

The storage stability is thus given by the following formula (I)

$$SS = MV2 - MV1 \qquad (I)$$

where
MV1 is the Mooney viscosity of a nitrile rubber and
MV2 is the Mooney viscosity of the same nitrile rubber after storage at 100° C. for 48 hours.

The values for the Mooney viscosity (ML1+4@100° C.) are in each case determined at 100° C. by means of a shear disc viscometer in accordance with DIN 53523/3 or ASTM D 1646.

It has been found to be useful to carry out the 48-hour storage of the nitrile rubber at 100° C. in a convection drying oven in which the oxygen content is unchanged compared to normal air.

A nitrile rubber is sufficiently storage stable if the storage stability SS is not more than 5 Mooney units. SS is preferably less than 5 Mooney units, particularly preferably not more than 4 Mooney units.

Nitrite Rubber:

The nitrile rubbers of the invention have repeating units of at least one α,β-unsaturated nitrile, at least one conjugated diene and optionally one or more further copolymerizable monomers.

The conjugated diene can have any nature. Preference is given to using ($C_4$-$C_6$)conjugated dienes. Particular preference is given to 1,3-butadiene, isoprene, 2,3-dimethylbutadiene, piperylene, 1,3-pentadiene or mixtures thereof. In particular, 1,3-butadiene or isoprene or mixtures thereof are used. Very particular preference is given to 1,3-butadiene.

As α,β-unsaturated nitrile, it is possible to use any known α,β-unsaturated nitrile; preference is given to ($C_3$-$C_5$)-α,β-unsaturated nitriles such as acrylonitrile, methacrylonitrile, 1-chloroacrylonitrile, ethacrylonitrile or mixtures thereof. Particular preference is given to acrylonitrile.

A particularly preferred nitrile rubber is thus a copolymer of acrylonitrile and 1,3-butadiene.

Apart from the conjugated diene and the α,β-unsaturated nitrile, one or more further copolymerizable monomers, e.g. α,β-unsaturated monocarboxylic or dicarboxylic acids, their esters or amides, can be additionally used. Such nitrile rubbers are customarily also referred to as carboxylated nitrile rubbers, or "XNBRs" for short.

As α,β-unsaturated monocarboxylic or dicarboxylic acids, it is possible to use, for example, fumaric acid, maleic acid, acrylic acid, methacrylic acid, crotonic acid and itaconic acid. Preference is given to maleic acid, acrylic acid, methacrylic acid and itaconic acid.

As esters of α,β-unsaturated carboxylic acids, use is made of, for example, alkyl esters, alkoxyalkyl esters, hydroxyalkyl esters or mixtures thereof.

Particularly preferred alkyl esters of α,β-unsaturated carboxylic acids are methyl(meth)acrylate, ethyl(meth)acrylate, propyl(meth)acrylate, n-butyl(meth)acrylate, t-butyl(meth)acrylate, hexyl(meth)acrylate, 2-ethylhexyl(meth)acrylate, octyl(meth)acrylate and lauryl(meth)acrylate. In particular, n-butyl acrylate is used.

Particularly preferred alkoxyalkyl esters of α,β-unsaturated carboxylic acids are methoxyethyl(meth)acrylate, ethoxyethyl(meth)acrylate and methoxyethyl(meth)acrylate. In particular, methoxyethyl acrylate is used.

Particularly preferred hydroxyalkyl esters of α,β-unsaturated carboxylic acids are hydroxyethyl(meth)acrylate, hydroxypropyl(meth)acrylate and hydroxybutyl(meth)acrylate.

Further esters of α,β-unsaturated carboxylic acids which can be used are, for example, polyethylene glycol(meth)acrylate, polypropylene glycol(meth)acrylate, glycidyl(meth)acrylate, epoxy(meth)acrylate and urethane(meth)acrylate.

Further possible monomers are vinylaromatics such as styrene, α-methylstyrene and vinylpyridine.

The proportions of conjugated diene and α,β-unsaturated nitrile in the nitrile rubbers of the invention can vary within a wide range. The proportion of the conjugated diene or of the sum of conjugated dienes is usually in the range from 20 to 95% by weight, preferably in the range from 40 to 90% by weight, particularly preferably in the range from 60 to 85% by weight, based on the total polymer. The proportion of the α,β-unsaturated nitrile or of the sum of α,β-unsaturated nitriles is usually from 5 to 80% by weight, preferably from 10 to 60% by weight, particularly preferably from 15 to 40% by weight, based on the total polymer. The proportions of the monomers in each case add up to 100% by weight.

The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or of the α,β-unsaturated nitrile or nitriles are replaced by proportions of these additional monomers, with the proportions of all monomers continuing to add up to 100% by weight If esters of (meth)acrylic acid are used as additional monomers, they are usually used in amounts of from 1 to 25% by weight.

If α,β-unsaturated monocarboxylic or dicarboxylic acids are used as additional monomers, they are usually used in amounts of less than 10% by weight.

The nitrogen content of the nitrile rubbers of the invention is determined by the Kjeldahl method in accordance with DIN 53 625. Owing to the content of polar comonomers, the nitrile rubbers are usually soluble in methyl ethyl ketone to an extent of ≧85% by weight at 20° C.

The nitrile rubbers have Mooney values (ML (1+4@100° C.)) of from 10 to 150, preferably from 20 to 100, Mooney units, particularly preferably from 25 to 60 Mooney units. This is the value MV1 in the context of formula (I).

The glass transition temperatures of the nitrile rubbers are in the range from −70° C. to +10° C., preferably in the range from −60° C. to 0° C.

Preference is given to nitrile rubbers according to the invention which comprise repeating units of acrylonitrile, 1,3-butadiene and optionally of one or more further copolymerizable monomers. Preference is likewise given to nitrile rubbers having repeating units of acrylonitrile, 1,3-butadiene and one or more α,β-unsaturated monocarboxylic or dicarboxylic acids, their esters or amides, and in particular repeating units of an alkylester of an α,β-unsaturated carboxylic acid, very particularly preferably of methyl(meth)acrylate, ethyl(meth)acrylate, propyl(meth)acrylate, n-butyl(meth)acrylate, t-butyl(meth)acrylate, hexyl(meth)acrylate, 2-ethylhexyl(meth)acrylate, octyl(meth)acrylate or lauryl(meth)acrylate.

Preferably the inventive nitrile rubber contains 2,2,4,6,6-pentamethylheptane-4-thio-, 2,4,4,6,6-pentamethylheptane-2-thio-, 2,3,4,6,6-pentamethyl-heptane-2-thio and 2,3,4,6,6-pentamethyl-heptane-3-thio end groups.

The present invention further provides a process for producing nitrile rubbers by emulsion polymerization of at least one α,β-unsaturated nitrile, at least one conjugated diene and optionally one or more further copolymerizable monomers, with the latex containing nitrile rubber which is initially obtained in the polymerization being subjected to coagulation and the coagulated nitrile rubber obtained subsequently being washed, characterized in that (i) the emulsion polymerization is carried out in the presence of a mixture containing 2,2,4,6,6-pentamethylheptane-4-thiol, 2,4,4,6,6-pentamethylheptane-2-thiol, 2,3,4,6,6-pentamethylheptane-2thiol and 2,3,4,6,6-pentamethylheptane-3-thiol, (ii) the latex containing the nitrile rubber which is obtained after the polymerization is subjected to coagulation using at least one salt selected from the group consisting of aluminium, calcium, magnesium, sodium, potassium and lithium salts, (iii) either a water-soluble calcium salt is present in the coagulation and/or the washing of the coagulated nitrile rubber is carried out using water containing calcium ions and (iv) a salt based on a chloride is present either during the emulsion polymerization, during the coagulation or during the subsequent washing of the coagulated nitrile rubber.

Process for Producing the Nitrile Rubbers:

The nitrile rubbers are produced by emulsion polymerization in the process of the invention.

As emulsifiers, it is possible to use water-soluble salts of anionic emulsifiers or uncharged emulsifiers. Preference is given to using anionic emulsifiers.

As anionic emulsifiers, it is possible to use modified resin acids which are obtained by dimerization, disproportionation, hydrogenation and modification of resin acid mixtures containing abietic acid, neoabietic acid, palustric acid, laevopimaric acid. A particularly preferred modified resin acid is disproportionated resin acid (Ullmann's Encyclopedia of Industrial Chemistry, 6th Edition, Volume 31, pp. 345-355).

It is also possible to use fatty acids as anionic emulsifiers. These contain from 6 to 22 carbon atoms per molecule. They can be fully saturated or have one or more double bonds in the molecule. Examples of fatty acids are caproic acid, lauric acid, myristic acid, palmitic acid, stearic acid, oleic acid, linoleic acid, linolenic acid. The carboxylic acids are usually based on origin-specific oils or fats such as caster oil, cottonseed oil, peanut oil, linseed oil, coconut oil, palm kernel oil, olive oil, rapeseed oil, soybean oil, fish oil and beef talo, etc. (Ullmann's Encyclopedia of Industrial Chemistry, 6th Edition, Volume 13, pp. 75-108). Preferred carboxylic acids are derived from coconut fatty acid and from beef talo and are partially or fully hydrogenated.

Such carboxylic acids based on modified resin acids or fatty acids are used as water-soluble lithium, sodium, potassium and ammonium salts. The sodium and potassium salts are preferred.

Further anionic emulsifiers are sulphonates, sulphates and phosphates which are bound to an organic radical. Possible organic radicals are aliphatic radicals, aromatic radicals, alkylated aromatics, fused aromatics and methylene-bridged aromatics, with the methylene-bridged and fused aromatics being able to be additionally alkylated. The length of the alkyl chains is from 6 to 25 carbon atoms. The length of the alkyl chains bound to the aromatics is from 3 to 12 carbon atoms.

The sulphates, sulphonates and phosphates are used as lithium, sodium, potassium and ammonium salts. The sodium, potassium and ammonium salts are preferred.

Examples of such sulphonates, sulphates and phosphates are Na laurylsulphate, Na-alkylsulphonate, Na-alkylarylsulphonate, Na salts of methylene-bridged aryl sulphonates, Na salts of alkylated naphthalenesulphonates and the Na salts of methylene-bridged naphthalenesulphonates which can also be oligomerized, with the degree of oligomerization being in the range from 2 to 10. The alkylated naphthalenesulphonic acids and the methylene-bridged (and optionally alkylated) naphthalenesulphonic acids are usually present as mixtures of isomers which can also contain more than 1 sulphonic acid group (from 2 to 3 sulphonic acid groups) in the molecule. Particular preference is given to Na laurylsulphate, Na alkylsulphonate mixtures having from 12 to 18 carbon atoms, Na alkylarylsulphonates, Na diisobutylenenaphthalenesulphonate, methylene-bridged polynaphthalenesulphonate mixtures and methylene-bridged arylsulphonate mixtures.

Uncharged emulsifiers are derived from addition products of ethylene oxide and of propylene oxide onto compounds having a sufficiently acidic hydrogen. These include, for example, phenol, alkylated phenol and alkylated amines. The average degrees of polymerization of the epoxides are in the range from 2 to 20. Examples of uncharged emulsifiers are ethoxylated nonylphenols having 8, 10 and 12 ethylene oxide units. The uncharged emulsifiers are usually not used alone but in combination with anionic emulsifiers.

Preference is given to the Na and K salts of disproportionated abietic acid and of partially hydrogenated talo fatty acid and also mixtures thereof, sodium laurylsulphate, Na alkylsulphonates, sodium alkylbenzenesulphonate and also alkylated and methylene-bridged naphthalenesulfonic acids.

The emulsifiers are used in an amount of from 0.2 to 15 parts by weight, preferably from 0.5 to 12.5 parts by weight, particularly preferably from 1.0 to 10 parts by weight, per 100 parts by weight of the monomer mixture.

The emulsion polymerization is carried out using the emulsifiers mentioned. If latices which due to some instability tend to premature self-coagulation are obtained after the polymerization, the emulsifiers mentioned can also be used for after-stabilization of the latices. This can, in particular, be necessary before removal of unreacted monomers by treatment with steam or before storage of the latex.

The process according to the invention is carried out in the presence of a mixture which contains 2,2,4,6,6-pentamethylheptane-4-thiol,
2,4,4,6,6-pentamethylheptane-2-thiol,
2,3,4,6,6-pentamethylheptane-2-thiol and
2,3,4,6,6-pentamethylheptane-3-thiol.

This mixture of $C_{12}$-mercaptans serves to regulate the molecular weight of the nitrile rubber being formed. A detailed description of this mixture and a process for preparing it may be found in a patent application filed on the same day by Lanxess Deutschland GmbH.

The abovementioned mixture to regulate the molecular weight of the nitrile rubber is used in amounts of from 0.05 to 3 parts by weight, preferably from 0.1 to 1.5 parts by weight, per 100 parts by weight of the monomer mixture.

The mixture to regulate the molecular weight is introduced either at the beginning of the polymerization or in portions during the polymerization, with preference being given to addition of all or individual components of the regulator mixture in portions during the polymerization.

Initiation of the emulsion polymerization is typically carried out using polymerization initiators which disintegrate into free radicals. As such initiators include compounds which contain an —O—O-unit (peroxo compounds) or an —N=N-unit (azo compound).

The peroxo compounds include hydrogen peroxide, peroxodisulphates, peroxodiphosphates, hydroperoxides, peracids, peracid esters, peracid anhydrides and peroxides having two organic radicals. Salts of peroxodisulphuric acid and of peroxodiphosphoric acid used may be sodium, potassium and ammonium salts. Suitable hydroperoxides are, for example, t-butyl hydroperoxide, cumene hydroperoxide and p-menthane hydroperoxide. Suitable peroxides having two organic radicals are dibenzoyl peroxide, bis-2,4-dichlorobenzoyl peroxide, di-t-butyl peroxide, dicumyl peroxide, t-butyl perbenzoate, t-butyl peracetate, etc. Suitable azo compounds are azobisisobutyronitrile, azobisvaleronitrile and azobiscyclohexanenitrile.

Hydrogen peroxide, hydro peroxides, peracids, peracid esters peroxodisulphate and peroxodisphosphate are also used in combination with reducing agents. Suitable reducing agents are sulphenates, sulphinates, sulphoxylates, dithionite, sulphite, metabisulphite, disulphite, sugar, urea, thiourea, xanthogenates, thioxanthogenates, hydrazinium salts, amines and amine derivatives such as aniline, dimethylaniline, monoethanolamine, diethanolamine or triethanolamine. Initiator systems consisting of an oxidizing agent and a reducing agent are referred to as redox systems. When redox systems are employed, salts of transition metals such as iron, cobalt or nickel are frequently also used in combination with suitable complexing agents such as sodium ethylenediaminetetraacetate, sodium nitrilotriacetate and trisodium phosphate or tetrapotassium diphosphate.

Preferred redox systems are: 1) potassium peroxodisulphate in combination with triethanolamine, 2) ammonium peroxodiphosphate in combination with sodium metabisulphite ($Na_2S_2O_5$), 3) p-methane hydroperoxide/sodium formaldehydesulphoxylate in combination with Fe(II) sulphate ($FeSO_4 \cdot 7H_2O$), sodium ethylenediaminoacetate and trisodium phosphate, 4) cumene hydroperoxide/sodium formaldehydesulphoxylate in combination with Fe(II) sulphate ($FeSO_4 \cdot 7H_2O$), sodium ethylenediaminoacetate and tetrapotassium disphosphate.

The amount of oxidizing agent is from 0.001 to 1 part by weight per 100 parts by weight of monomer. The molar amount of reducing agent is in the range from 50% to 500%, based on the molar amount of the oxidizing agent used.

The molar amount of complexing agents is based on the amount of transition metal used and is usually equimolar with this.

To carry out the polymerization, all or individual components of the initiator system are introduced at the beginning of the polymerization or during the polymerization.

The addition of all or individual components of the initiator system in portions during the polymerization is preferred. The sequential addition enables the reaction rate to be controlled.

The polymerization time is in the range from 5 h to 15 h and depends essentially on the acrylonitrile content of the monomer mixture and on the polymerization temperature.

The polymerization temperature is in the range from 0 to 30° C., preferably in the range from 5 to 25° C.

After conversions in the range from 50 to 90%, preferably in the range from 70 to 85%, have been reached, the polymerization is stopped.

For this purpose, a stopper is added to the reaction mixture. Suitable stoppers are, for example, dimethyl dithiocarbamate, Na nitrile, mixtures of dimethyl dithiocarbamate and Na nitrile, hydrazine and hydroxylamine and also salts derived therefrom, e.g. hydrazinium sulphate and hydroxylammonium sulphate, diethylhydroxylamine, diisopropylhydroxylamine, water-soluble salts of hydroquinone, sodium dithionite, phenyl-α-naphthylamine and aromatic phenols such as tert-butylcatechol or phenothiazine.

The amount of water used in the emulsion polymerization is in the range from 100 to 900 parts by weight, preferably in the range from 120 to 500 parts by weight, particularly preferably in the range from 150 to 400 parts by weight, of water per 100 parts by weight of the monomer mixture.

It is possible to add salts to the aqueous phase in the emulsion polymerization in order to reduce the viscosity during the polymerization, to adjust the pH and to buffer the pH. Salts usually used for this purpose are salts of monovalent metals in the form of potassium and sodium hydroxide, sodium sulphate, sodium carbonate, sodium hydrogencarbonate, lithium chloride, sodium chloride and potassium chloride. Preference is given to sodium and potassium hydroxide, sodium hydrogencarbonate, lithium, sodium and potassium chloride. The amounts of these electrolytes are in the range from 0 to 1 part by weight, preferably from 0 to 0.5 part by weight, per 100 parts by weight of the monomer mixture. The addition of a chloride-containing salt during the emulsion polymerization is necessary when a chloride-containing salt is to be used neither in the following coagulation nor in the subsequent washing of the coagulated nitrile rubber (feature (iv) of the process of the invention).

The polymerization can be carried out either batchwise or continuously in a cascade of stirred vessels.

To achieve a uniform course of the polymerization, only part of the initiator system is used to start the polymerization and the remainder is fed in during the polymerization. The polymerization is usually started using from 10 to 80% by weight, preferably 30-50% by weight, of the total amount of initiator. The introduction of individual constituents of the initiator system after commencement of the polymerization is also possible.

If chemically uniform products are to be produced, further acrylonitrile or butadiene is introduced when the composition goes outside the azeotropic butadiene/acrylonitrile ratio. Further introduction is preferably carried out in the case of NBR grades having acrylonitrile contents of from 10 to 34% by weight and in the case of grades containing from 40 to 50% by weight of acrylonitrile (W. Hofmann, Rubber Chem. Technol. 36 (1963) 1). The further introduction is, as indicated, for example, in DD 154 702, preferably carried out under computer control on the basis of a computer program.

To remove unreacted monomers and volatile constituents, the stopped latex is subjected to a steam distillation. Here, temperatures in the range from 70° C. to 150° C. are employed, with the pressure being reduced at temperatures of <100° C.

Before removal of the volatile constituents, the latex can be after-stabilized by means of an emulsifier. For this purpose, it is advantageous to use the abovementioned emulsifiers in amounts of from 0.1 to 2.5% by weight, preferably from 0.5 to 2.0% by weight, per 100 parts by weight of nitrile rubber.

Coagulation of the Latex:

Before or during coagulation of the latex, one or more ageing inhibitors can be added to the latex. Phenolic, amine and other ageing inhibitors are suitable for this purpose.

Suitable phenolic ageing inhibitors are alkylated phenols, styrenized phenol, sterically hindered phenols such as 2,6-di-tert-butylphenol, 2,6di-tert-butyl-p-cresol (BHT), 2,6-di-tert-butyl-4-ethylphenol, sterically hindered phenols containing ester groups, sterically hindered phenols containing thioethers, 2,2'-methylenebis(4-methyl-6-tert-butylphenol) (BPH) and sterically hindered thiobisphenols.

If discoloration of the rubber is of no importance, amine ageing inhibitors, e.g. mixtures of diaryl-p-phenylenediamines (DTPD), octylated diphenylamine (ODPA), phenyl-a-naphthylamine (PAN), phenyl-β-naphthylamine (PBN), preferably ones based on phenylenediamine, are also used. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis-1,4-(1,4-dimethylpentyl)-p-phenylenediamine (77PD), etc.

The other ageing inhibitors include phosphites such as tris(nonylphenyl) phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI). The phosphites are generally used in combination with phenolic ageing inhibitors, TMQ, MBI and MMBI are used particularly for NBR grades which are vulcanized peroxidically.

The latex having a pH of at least 6, preferably >6, is used for the coagulation. If appropriate, this pH is set by addition of a base, preferably ammonia or sodium hydroxide or potassium hydroxide.

The coagulation is carried out using at least one salt selected from the group consisting of aluminium, calcium, magnesium, sodium, potassium and lithium salts.

As anions of these salts, it is usual to use monovalent or divalent anions. Preference is given to halide, particularly preferably chloride, nitrate, sulphate, hydrogencarbonate, carbonate, formate and acetate.

Examples of suitable salts are sodium chloride, potassium chloride, calcium chloride, magnesium chloride, sodium nitrate, potassium nitrate, sodium sulphate, potassium sulphate, sodium hydrogencarbonate, potassium hydrogencarbonate, sodium carbonate, potassium carbonate, aluminium sulphate, potassium aluminium sulphate (potassium alum), sodium aluminium sulphate (sodium alum), sodium acetate, calcium acetate and calcium formate.

To achieve the specific calcium content of the nitrile rubbers of the invention, it is important that either at least one water-soluble calcium salt is present during the coagulation of the latex or else, if this should not be the case, the subsequent washing of the coagulated nitrile rubber is carried out using water which has not been deionized and thus contains calcium ions.

If a water-soluble calcium salt is used for the coagulation of the latex, calcium chloride is preferred.

The concentration of the solution of one or more salts selected from the group consisting of aluminium, calcium, magnesium, sodium, potassium and lithium salts is from 3 to 30% by weight. Preference is given to using water containing Ca ions for preparing the salt solution.

The total amount of salts selected from the group consisting of aluminium, calcium, magnesium, sodium, potassium and lithium salts which is necessary for coagulation of the latex is 0.5-200% by weight, preferably 0.8-80% by weight, particularly preferably 1-50% by weight, of salt, based on 100 parts by weight of nitrile rubber.

In addition to the at least one salt selected from the above-defiled group, precipitation aids can also be used in the coagulation. Possible precipitation aids are, for example, water-soluble polymers. These are non-ionic, anionic or cationic.

Examples of non-ionic polymeric precipitation aids are modified cellulose such as hydroxyalkylcellulose or methylcellulose and also adducts of ethylene oxide and propylene oxide onto compounds having an acidic hydrogen. Examples of compounds having an acidic hydrogen are: fatty acids, sugars such as sorbitol, monoglycerides and diglycerides of fatty acids, phenol, alkylated phenols, (alkyl)phenol-formaldehyde condensates, etc. The addition products of ethylene oxide and propylene oxide onto these compounds can have a random or blocked structure. Among these products, preference is given to those whose solubility decreases with increasing temperature. Characteristic clouding temperatures are in the range from 0 to 100° C., in particular in the range from 20 to 70° C.

Examples of anionic polymeric precipitation aids are the homopolymers and copolymers of (meth)acrylic acid, maleic acid, maleic anhydride, etc. Preference is given to the Na salt of polyacrylic acid.

Cationic polymeric precipitation aids are usually based on polyamines or on homopolymers and copolymers of (meth)acrylamide. Preference is given to polymethacrylamides and polyamines, in particular those based on epichlorohydrin and dimethylamine.

The amounts of polymeric precipitation aids are from 0.01 to 5 parts by weight, preferably from 0.05 to 2.5 parts by weight, per 100 parts by weight of nitrile rubber.

The use of other precipitation aids is also conceivable. However, it may be remarked that it is readily possible to carry out the process of the invention with the desired success in the absence of additional precipitation aids and, in particular, in the absence of $C_1$-$C_4$-alkylcelluloses, hydroxyalkylcelluloses, plant-based protein-like materials or polysaccharides such as starch or water-soluble polyamine compounds.

The latex used for the coagulation advantageously has a solids concentration in the range from 1% to 40%, preferably in the range from 5% to 35% and particularly preferably in the range from 15 to 30% by weight.

The coagulation of the latex is carried out in the temperature range from 10 to 100° C. The coagulation of the latex is preferably carried out at a temperature of from 20 to 90° C.

The coagulation of the latex can be carried out continuously or batchwise, and is preferably carried out continuously.

Washing of the Coagulated Nitrite Rubber:

After the coagulation, the nitrile rubber is usually present in the form of crumb. The washing of the coagulated NBR is therefore also referred to as crumb washing. It is possible to use either deionized water (also termed DW) or water which has not been deionized (also termed BW) for washing this coagulated crumb. If no calcium salt is present in the coagulation of the latex using at least one salt selected form the above-defined group of salts, water which has not been deionized and thus contains calcium ions is used in the washing of the coagulated is used nitrile rubber.

Washing is carried out at a temperature in the range from 15 to 90° C., preferably at a temperature in the range from 20 to 80° C.

The amount of washing water is from 0.5 to 20 parts by weight, preferably from 1 to 10 parts by weight and particularly preferably from 1 to 5 parts by weight, per 100 parts by weight of nitrile rubber.

The rubber crumb is preferably subjected to multistage washing, with the rubber crumb being partially dewatered between the individual washing stages. The residual moisture contents of the crumb between the individual washing stages are in the range from 5 to 50% by weight, preferably in the range from 7 to 25% by weight. The number of washing stages is usually from 1 to 7, preferably from 1 to 3. Washing is carried out batchwise or continuously. Preference is given to using a multistage, continuous process, with countercurrent washing being preferred in order to save water.

Dewatering and Drying:

After washing is complete, it has been found to be useful to dewater the nitrile rubber crumb. This is usually carried out in two stages. In the first stage, the rubber crumb is subjected to preliminary mechanical dewatering. In the second stage, the remaining water is evaporated. Both preliminary dewatering and drying are preferably carried out continuously. Suitable apparatuses for the preliminary mechanical dewatering are strainer screws in which the water is squeezed out laterally via a strainer slit or screws in which mechanical dewatering is effected against the product stream (Welding principle).

The cation contents remaining in the nitrile rubber can be additionally influenced if desired by the degree of preliminary mechanical dewatering. This can be advantageous particularly when inefficient washing is employed. Efficient washing gives the appropriate cation contents immediately after washing. The water contents after preliminary mechanical dewatering are in the range from 5 to 25% by weight. To adjust the cation mix remaining in the product, it has been found to be useful for the water contents after preliminary mechanical dewatering to be from 5 to 15% by weight, in particular from 5 to 10% by weight.

Drying of the nitrile rubber which has been subjected to preliminary dewatering is carried out in a fluidized-bed dryer or in a plate dryer. The temperatures during drying are in the range from 80 to 150° C. Preference is given to drying according to a temperature programme, with the temperature being reduced towards the end of the drying process.

The nitrile rubbers of the invention which have the specified content of calcium and chlorine surprisingly have the desired high storage stability SS of not more than 5 Mooney units. The high storage stability has positive effects even during drying of the nitrile rubber, since some unintended ageing of the rubber otherwise takes place during this drying. The high storage stability aids the setting of a prescribed target Mooney viscosity. The amount of out-of-specification nitrile rubber is reduced as a result. Furthermore, the high storage stability results in a reduction in complaints due to a change in the Mooney viscosity during long storage or transport times. The rubbers of the invention are suitable for the reproducible production of vulcanizable mixtures. The mouldings obtained therefrom by vulcanization thus also have a reproducible mechanical and physical property profile.

The invention therefore also provides for the use of the nitrile rubbers of the invention for producing vulcanizable mixtures containing at least one nitrile rubber according to the invention, at least one crosslinker and optionally further additives.

These vulcanizable mixtures are produced by mixing at least one nitrile rubber according to the invention, at least one crosslinker and optionally further additives.

As crosslinker, it is possible to use, for example, peroxidic crosslinkers such as bis(2,4-dichlorobenzyl)peroxide, dibenzoyl peroxide, bis(4-chlorobenzoyl)peroxide, 1,1-bis-(t-butylperoxy)-3,3,5-trimethylcyclohexane, tert-butyl perbenzoate, 2,2-bis(t-butylperoxy)butene, 4,4-di-tert-butylperoxynonyl valerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)hex-3-yne.

It can be advantageous to use not only these peroxidic crosslinkers but also further additives by means of which the crosslinking yield can be increased: suitable additives of this type are, for example, triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, Zn diacrylate, Zn dimethacrylate, 1,2-polybutadiene or N,N'-m-phenylenedimaleimide.

The total amount of the crosslinker or crosslinkers is usually in the range from 1 to 20 phr, preferably in the range from 1.5 to 15 phr and particularly preferably the range from 2 to 10 phr, based on the nitrile rubber.

It is also possible to use sulphur in elemental soluble or insoluble form or sulphur donors as crosslinker.

Possible sulphur donors are, for example, dimorpholyl disulphide (DTDM), 2-morpholino-dithiobenzothiazol (MBSS), caprolactam disulphide, dipentamethylenethiuram tetrasulphide (DPTT), and tetramethylthiuram disulphide (TMTD).

In the sulphur vulcanization of the nitrile rubbers of the invention, too, it is possible to use further additives by means of which the crosslinking yield can be increased. However, crosslinking can in principle also he carried out using sulphur or sulphur donors alone.

Conversely, crosslinking of the nitrile rubbers of the invention can also be carried out only in the presence of the abovementioned additives, i.e. without addition of elemental sulphur or sulphur donors.

Suitable additives by means of which the crosslinking yield can be increased are, for example, dithiocarbamates, thiurams, thiazoles, sulphenamides, xanthogenates, guanidine derivatives, caprolactams and thiourea derivatives.

As dithiocarbamates, it is possible to use, for example: ammonium dimethyldithiocarbamate, sodium diethyldithiocarbamate (SDEC), sodium dibutyldithiocarbamate (SDBC), zinc dimethyl-dithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyl-dithiocarbamate, nickel dimethyldithiocarbamate and zinc diisononyldithiocarbamate.

As thiurams, it is possible to use, for example: tetramethylthiuram disulphide (TMTD), tetramethylthiuram monosulphide (TMTM), dimethyldiphenylthiuram disulphide, tetrabenzylthiuram. disulphide, dipentamethylenethiuram tetrasulphide and tetraethylthiuram disulphide (TETD).

As thiazoles, it is possible to use, for example: 2-mercaptobenzothiazole (MBT), dibenzthiazyl disulphide (MBTS), zinc mercaptobenzothiazole (ZMBT) and copper-2-mercaptobenzothiazole.

As sulphonamide derivatives, it is possible to use, for example: N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothiazole (MBS), N-oxy-diethylenethiocarbamyl-N-tert-butylsulphenamide and oxydiethylenethiocarbamyl-N-oxyethylene-sulphenamide.

As xanthogenates, it is possible to use, for example: sodium dibutylxanthogenate, zinc isopropyl-dibutylxanthogenate and zinc dibutylxanthogenate.

As guanidine derivatives, it is possible to use, for example: diphenylguanidine (DPG), di-o-tolylguanidine (DOTG) and o-tolylbiguanide (OTBG).

As dithiophosphates, it is possible to use, for example: zinc dialkydithiophosphate (chain length of the alkyl radicals: $C_2$ to $C_{16}$), copper dialkyldithiophosphates (chain length of the alkyl radicals: $C_2$ to $C_{16}$) and dithiophosphoryl polysulphide.

As caprolactam, it is possible to use, for example, dithiobis-caprolactam.

As thiourea derivatives, it is possible to use, for example, N,N'-diphenylthiourea (DPTU), diethylthiourea (DETU) and ethylenethiourea (ETU).

Further suitable additives are, for example: zinc diaminediisocyanate, hexamethylenetetramine, 1,3-bis(citraconimidomethyl)benzene and cyclic disulphanes.

Both the additives mentioned and the crosslinkers can be used either individually or in mixtures. Preference is given to using the following substances for crosslinking the nitrile rubbers: sulphur, 2-mercaptobenzothiazol, tetramethyithiuram disulphide, tetramethylthiuram monosulphide, zinc dibenzyldithiocarbamate, dipentamethylenethiuram tetrasulphide, zinc dialkydithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

The crosslinkers and abovementioned additives can each be used in amounts of from about 0.05 to 10 phr, preferably from 0.1 to 8 phr, in particular from 0.5 to 5 phr (single addition, in each case based on the active substance).

In sulphur crosslinking according to the invention, it may also be useful to employ further inorganic or organic substances in addition to the crosslinkers and abovementioned additives. Examples of such further substances are: zinc oxide, zinc carbonate, lead oxide, magnesium oxide, saturated or unsaturated organic fatty acids and their zinc salts, polyalcohols, amino alcohols such as triethanolamine and also amines such as dibutylamine, dicyclohexylamine, cyclohexylethylamine and polyether amines.

In addition, it is also possible to use initial vulcanization inhibitors. These include cyclohexylthiophthalimide (CTP), N,N'-dinitrosopentamethylenetetramine (DNPT), phthalic anhydride (PTA) and diphenylnitrosamine. Preference is given to cyclohexylthiophthalimide (CTP).

Apart from the addition of the crosslinker or crosslinkers, the nitrile rubber of the invention can also be mixed with further customary rubber additives.

These include, for example, the typical substances which are adequately known to those skilled in the art, for example fillers, filler activators, ozone protection agents, ageing inhibitors, antioxidants, processing aids, extender oils, plasticizers, reinforcing materials and mould release agents.

As fillers, it is possible to use, for example, carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form) or silicates.

Possible filler activators are, in particular, organic silanes such as vinyltrimethyloxysilane, vinyldimethoxymethylsilane, vinyltriethoxysi lane, vinyltris(2-methoxyethoxy)si lane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler activators are, for example, surface-active substances such as triethanolamine and ethylene glycols having molecular weights of from 74 to 10000 g/mol. The amount of filler activators is usually from 0 to 10 phr, based on 100 phr of the nitrile rubber.

As ageing inhibitors, it is possible to add those which have already been described in the present application in respect of coagulation of the latex to the vulcanizable mixtures. These are usually used in amounts of about 0-5 phr, preferably from 0.5 to 3 phr, based on 100 phr of the nitrile rubber.

Possible mould release agents are, for example: saturated and partially unsaturated fatty acids and oil acids and their derivatives (fatty acid esters, fatty acid salts, fatty alcohols, fatty acid amides), which are preferably employed as constituents of the mixture, also products which can be applied to the mould surface, for example products based on low molecular weight silicone compounds, products based on fluoropolymers and products based on phenolic resins.

When used as constituents of the mixture, the mould release agents are used in amounts of about 0-10 phr, preferably from 0.5 to 5 phr, based on 100 phr of the nitrile rubber.

Reinforcement by means of strength carriers (fibres) composed of glass, according to the teachings of U.S. Pat. No. 4,826,721, is also possible as is reinforcement by means of cords, woven fabrics, fibres composed of aliphatic and aromatic polyamides (Nylon®, Aramid®), polyesters and natural fibre products.

The invention further provides a process for producing mouldings based on at least one nitrile rubber according to the invention, which is characterized in that the above-described vulcanizable mixture is vulcanized in a shaping process, preferably using an injection-moulding process.

The invention thus likewise provides the specific shaped part which can be obtained by the abovementioned vulcanization process.

This process makes it possible to produce a large number of mouldings, e.g. a seal, a cap, a hose or a diaphragm. The nitrile rubbers of the invention having the specific ion index are particularly suitable for producing an O-ring seal, a flat seal, a corrugated sealing ring, a sealing sleeve, a sealing cap, a dust protection cap, a plug seal, a thermalinsulation hose (with or without addition of PVC), an oil cooler hose, an air intake hose, a servo control hose or a pump diaphragm.

In the alternative to the direct preparation of shaped parts on the basis of the inventive nitrile rubbers it is also possible that the preparation of the inventive nitrile rubber is followed either (i) by a metathetic degradation process or (ii) a metathetic degradation process and a subsequent hydrogenation or (iii) only a hydrogenation. This metathetic degradation process and the hydrogenation reactions are both adequately known to those skilled in the art and described in literature.

The metathesis is e.g. known from WO-A-02/100941 as well as from WO-A-02/100905.

It is possible to carry out the hydrogenation with use of homogeneous or heterogeneous hydrogenation catalysts. It is also possible to carry out the hydrogenation in situ, i.e. in the same reaction vessel in which the optional metathetic degradation has previously also been carried out and without the necessity of isolating the degraded nitrile rubber. The hydrogenation catalyst is simply added to the reaction vessel.

The catalysts used are usually based on rhodium, ruthenium or titanium, but it is also possible to use platinum, iridium, palladium, rhenium, ruthenium, osmium, cobalt or copper either as metal or preferably in the form of metal compounds (cf., for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for a hydrogenation in the homogeneous phase are described below and are also known from DE-A-25 39 132 and EP-A-0 471 250.

The selective hydrogenation can be achieved, for example, in the presence of a rhodium- or ruthenium-containing catalyst. It is possible to use, for example, a catalyst of the general formula

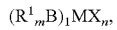

where M is ruthenium or rhodium, the radicals $R^1$ are identical or different and are each a $C_1$-$C_8$-alkyl group, a $C_4$-$C_8$-cycloalkyl group, a $C_6$-$C_{15}$-aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3, Preferred catalysts are tris(triphenylphosphine)rhodium(I) chloride, tris(triphenylphosphine)rhodium(III) chloride and tris(dimethyl sulphoxide)rhodium(III) chloride and also tetrakis (triphenylphosphine)rhodium hydride of the formula $(C_6H_5)_3 P)_4RhH$ and the corresponding compounds in which the triphenylphosphine has been completely or partly replaced by tricyclohexylphosphine. The catalyst can be utilized in small amounts. An amount in the range 0.01-1% by weight, preferably in the range 0.03-0.5% by weight and particularly preferably in the range 0.1-0.3% by weight, based on the weight of the polymer, is suitable.

It is usually appropriate to use the catalyst together with a co-catalyst which is a ligand of the formula $R^1{}_mB$, where $R^1$, m and B have the meanings given above for the catalyst. Preferably, m is 3, B is phosphorus and the radicals $R^1$ can be identical or different. Preference is given to cocatalysts having trialkyl, tricycloalkyl, triaryl, triaralkyl, diarylmonoalkyl, diaryl-monocycloalkyl, dialkyl-monoaryl, dialkyl-monocycloalkyl, dicycloalkyl-monoaryl or dicycloalkyl-monoaryl radicals.

Examples of co-catalysts may be found in, for example, U.S. Pat. No. 4,631,315. A preferred cocatalyst is triphenylphosphine. The co-catalyst is preferably used in amounts in the range 0.3-5% by weight, preferably in the range 0.5-4% by weight, based on the weight of the nitrile rubber to be hydrogenated. Furthermore, the weight ratio of the rhodium-containing catalyst to the cocatalyst is preferably in the range from 1:3 to 1:55, more preferably in the range from 1:5 to 1:45. Based on 100 parts by weight of the nitrile rubber to be hydrogenated, it is appropriate to use from 0.1 to 33 parts by weight of the cocatalyst, preferably from 0.5 to 20 parts by weight and very particularly preferably from 1 to 5 parts by weight, in particular more than 2 but less than 5 parts by weight, of cocatalyst per 100 parts by weight of the nitrile rubber to be hydrogenated.

The practical implementation of this hydrogenation is adequately known to those skilled in the art from U.S. Pat. No. 6,683,136. It is usually carried out by treating the nitrile rubber to be hydrogenated in a solvent such as toluene or monochlorobenzene with hydrogen at a temperature in the range from 100 to 150° C. and a pressure in the range from 50 to 150 bar for from 2 to 10 hours.

For the purposes of the present invention, hydrogenation is a reaction of the double bonds present in the starting nitrile rubber to an extent of at least 50%, preferably 70-100%, particularly preferably 80-100%.

When heterogeneous catalysts are used, these are usually supported catalysts based on palladium which are, for example, supported on carbon, silica, calcium carbonate or barium sulphate.

In analogy to the inventive nitrile rubbers the optionally hydrogenated nitrile rubbers obtained after the metathesis and/or hydrogenation reaction of the inventive nitrile rubber may be incorporated into a vulcanizable mixture and used for producing mouldings and shaped parts. Such optionally hydrogenated nitrile rubbers have a Mooney-viscosity (ML (1+4@100° C.)) of 1 to 50, preferably of from 1 to 40 Mooney units.

EXAMPLES

I Production of the NBR Latices A, B, C

The NBR latices A, B and C used in example series 1) to 5) were produced according to the base formulation shown in Table 1, with all starting materials being reported in parts by weight per 100 parts by weight of the monomer mixture. Table I also indicates the respective polymerization conditions.

TABLE 1

|  | Latex No. | | |
| --- | --- | --- | --- |
|  | A | B | C |
| Butadiene | 73 | 81 | 56 |
| Acrylonitrile | 27 | 12.5/6.5 | 44 |
| Total amount of water | 190 | 180 | 170 |
| Erkantol ® BXG[1] | 3.69 | 3.69 | 3.69 |
| Baykanol ® PQ[2] | 1.10 | 1.10 | 1.10 |
| K salt of coconut fatty acid | 0.73 | 0.73 | 0.73 |
| KOH | 0.05 | 0.05 | 0.05 |
| t-DDM[3] | 0.24/0.24 | 0.27/0.15/0.06 | 0.5/0.2 |
| Potassium peroxodisulphate[4] | 0.39/0.19 | 0.45/0.20 | 0.27 |
| Tris(α-hydroxyethyl)amine[5] | 0.57 | 0.61 | 0.15 |
| Na dithionite[6] | 1.20 | 1.20 | 1.20 |
| Potassium hydroxide | 1.28 | 1.28 | 1.28 |
| Vulkanox ® KB[7] | 1.25 | 1.25 | 1.25 |
| Polymerization temperature [° C.] | 17 | 18 | 20 |
| Polymerization conversion [%] | 75 | 75 | 74.5 |
| Polymerization time [h] | 11 | 15 | 7.5 |

[1] Sodium salt of monosulphonated and disulphonated naphthalenesulphonic acids containing isobutylene oligomer radicals (Erkantol ® BXG)
[2] Sodium salt of methylenebisnaphthalenesulphonate (Baykanol ® PQ; Lanxess Deutschland GmbH)
[3] t-DDM: (tertiary dodecyl mercaptan); Lanxess Deutschland GmbH
[4] Aldrich catalogue No.: 21,622-4
[5] Aldrich catalogue No.: T5,830-0
[6] Aldrich catalogue No.: 15,795-3
[7] 2,6-Di-tert-butyl-p-cresol; Lanxess Deutschland GmbH If more than one value is given in one of the columns for the nitrile rubbers A, B and C in Table 1 above, this means that the total amount of the respective starting material was not introduced in one portion, but that a further addition was carried out (once or twice). The conversions at which this further addition was carried out are indicated below.

The NBR latices were carried out batchwise in a 2 m³ autoclave provided with a stirrer, 350 kg of the monomer mixture and a total amount of water of 700 kg were used in each of the autoclave batches. Of this amount of water, 650 kg were initially placed in the autoclave together with the emulsifiers (Erkantol® BXG, Baykanol® PQ and K salt of coconut fatty acid) and sodium hydroxide and flushed with a stream of nitrogen. The destabilized monomers and the first partial amount indicated in Table 1 of the molecular weight regulator t-DDM were then added and the reactor was closed. After thermostatting of the contents of the reactor, the polymerizations were started by addition of aqueous solutions of tris(α-hydroxyethyl)amine and of potassium peroxodisulphate (in the case of A and B, the first partial amount as indicated in Table 1).

The course of the polymerization was followed by gravimetric determinations of the conversion. At a polymerization conversion of 15%, the remaining amounts of potassium peroxodisulphate in the case of A and B and the remaining amount of t-DDM in the case of A were introduced. When the conversions indicated in Table 1 were reached, the polymerization was stopped by addition of an aqueous solution of sodium dithionite and potassium hydroxide. Unreacted monomers and other volatile constituents were removed by means of steam distillation.

In the case of latex B, the addition of a total of 19 parts by weight of acrylonitrile was carried out in portions: 12.5 parts by weight of acrylonitrile were initially placed in the reactor and a further 6.5 parts by weight were introduced at a conversion of 35%. The addition of t-DDM was likewise carried out in portions in the case of latex B: 0.27 part by weight of t-DDM was initially placed in the reactor, 0.15 part by weight was introduced at a conversion of 20% and 0.06 part by weight was introduced at a conversion of 40%.

In the case of latex C, the addition of t-DDM was likewise carried out in portions: 0.5 part by weight of t-DDM was initially placed in the reactor and 0.2 part by weight was introduced at a conversion of 15%.

The rubber latices or solid rubbers obtained had the following properties:

|  | Latex No. | | |
| --- | --- | --- | --- |
|  | A | B | C |
| Particle diameter [d50] [nm] | 400 | 360 | 350 |
| Solids content [% by weight] | 20.5 | 22.8 | 24.8 |
| pH | 8.4 | 11.4 | 10.9 |
| Acrylonitrile content [% by weight] | 28.9 | 18.8 | 38.6 |

Before coagulation of the respective NBR latex, the latex was in each case admixed with a 50% strength dispersion of Vulkanox® KB (1.25% by weight of Vulkanox® KB based on NBR solid). The Vulkanox® KB dispersion had been prepared beforehand at 95-98° C. by means of an Ultraturrax and comprised:

| | |
|---|---|
| 360 g | of deionized water ("DW") |
| 40 g | of ethoxylated nonylphenol (NP10 from Lanxess Deutschland GmbH) |
| 400 g | of Vulkanox ® KB |

The variation of the conditions in the coagulation of the latex and the washing of the crumb was carried out batchwise on aliquots of the latices A, B and C in a stirrable, open vessel having a capacity of 100 l.

The coagulation of the latex was in each case carried out using 25 kg of latex, with the amounts of salts necessary for quantitative coagulation of the latex being determined in preliminary tests. Both deionized water ("DW") and water which had not been deionized and thus contained calcium ions ("BW") were used for preparing the salt solutions. The salt solutions were placed in the coagulation vessel (type of salt, concentration of the salt solution; amounts of salt based on NBR, coagulation temperature, etc, are in each case listed in the tables below) before the latex was added while stirring. The coagulation of the latex was usually complete within a few minutes (<5 min). The amounts of salts were in each case selected so that the rubber crumb had a particle size of greater than 5 mm, so that the particles were not discharged during the subsequent washing of the crumb. To carry out the washing of the crumb, the vessel had an inlet and an outlet. Two rails were installed on the inside of the vessel, so that the outlet could be shut off by means of a screen (mesh opening: 2 mm) before washing was carried out so as to ensure that the coagulated particles were not flushed out during washing. In the experiments described here, washing was carried out using a constant water throughput of 200 l/h. Both deionized water (DW) and undeionized water (BW) were used for washing. The latex serum obtained in the precipitation was not removed from the coagulation vessel before commencement of washing; i.e. the latex serum was removed by dilution washing. The boundary conditions employed in washing of the crumb (type of water, washing temperature, washing time, etc) are listed in the tables below.

After washing was complete, the rubber crumb was taken out with the aid of a sieve, subjected to preliminary dewatering to a residual moisture content of from 5 to 20% by weight in a Welding screw and dried batchwise to a residual moisture content of <0.6% in a convection drying oven.

The dried NBR rubbers were characterized by the Mooney viscosity before and after hot air storage at 100° C. for 48 hours, i.e. the determination of the Mooney viscosity was carried out firstly directly after drying (i.e. before hot air storage) and subsequently after hot air ageing at 100° C. for 48 hours.

To determine the calcium content, 0.5 g of the nitrile rubbers were digested by dry ashing at 550° C. in a platinum crucible and subsequent dissolution of the ash in hydrochloric acid. After appropriate dilution of the digestion solution with deionized water, the calcium content was determined by ICP-OES (inductively coupled plasma-optical emission spectrometry) at a wavelength of 317.933 nm against calibration solutions matched to the acid matrix. Depending on the concentration of the elements in the digestion solution and the sensitivity of the measuring instrument used, the concentrations of the sample solutions were matched to the linear range of the calibration for the wavelengths used in each case (B. Welz "Atomic Absorption Spectrometry", 2nd Ed., Verlag Chemie, Weinheim 1985).

The chlorine content of the nitrile rubbers of the invention is determined as follows using a method based on DIN EN 14582, method A: the nitrile rubber sample is fused with sodium peroxide and potassium nitrate in a Parr pressure vessel. Sulphite solution is added to the resulting melt and the mixture is acidified with sulphuric acid. The chloride formed is determined in the resulting solution by potentiometric titration with silver nitrate solution and calculated as chlorine.

Examples 1-10

Examples According to the Invention and Comparative Examples

Storage stability of the nitrile rubber (28.9% by weight of acrylonitrile) which was obtained from latex A under the coagulation and washing conditions indicated in the table below.

Washing of the crumb was in all cases carried out at 20° C. using deionized water (DW).

The comparative examples are denoted by a "C" before the number.

| | | Coagulation of the latex | | | | | | | | | | |
|---|---|---|---|---|---|---|---|---|---|---|---|---|
| Example | pH of the latex | Type of salt | Conc. of the salt solution [% by weight] | Amount of salt based on NBR [% by weight] | T [° C.] | Washing time [h] | Chlorine content [ppm] | Ca [ppm] | Mg [ppm] | ML(1 + 4 @100° C.) [MU] | | |
| | | | | | | | | | | MV1 | MV2 | SS |
| 1 | 8.4 | $CaCl_2$ | 0.6 | 6 | 20 | 3.8 | 110 | 1290 | 3 | 52 | 55 | 3 |
| 2 | 8.4 | $CaCl_2$ | 1.2 | 12 | 20 | 3.5 | 108 | 1240 | 2 | 53 | 56 | 3 |
| 3 | 6.0/ HCl | $CaCl_2$ | 1.2 | 12 | 20 | 3.5 | 100 | 1235 | 2 | 50 | 50 | 0 |
| C4 | 6.0/ $H_2SO_4$ | $MgCl_2$ | 1.6 | 16 | 20 | 4.3 | 33 | 25 | 325 | 43 | 96 | 53 |
| C5 | 8.4 | $MgSO_4$ | 1.5 | 15 | 20 | 3.5 | 30 | 10 | 350 | 48 | 67 | 19 |
| C6 | 6.0/ $H_2SO_4$ | $MgSO_4$ | 1.0 | 10 | 20 | 2.5 | 25 | 5 | 260 | 46 | 111 | 65 |
| C7 | 8.4 | $Al_2(SO_4)_3$ | 0.15 | 1.5 | 20 | 2.7 | 29 | 2 | 3 | 50 | 164 | 114 |

-continued

| | | Coagulation of the latex | | | | | | | | ML(1 + 4 @100° C.) [MU] | | |
|---|---|---|---|---|---|---|---|---|---|---|---|---|
| Example | pH of the latex | Type of salt | Conc. of the salt solution [% by weight] | Amount of salt based on NBR [% by weight] | T [° C.] | Washing time [h] | Chlorine content [ppm] | Ca [ppm] | Mg [ppm] | MV1 | MV2 | SS |
| C8 | 6.0/ $H_2SO_4$ | $Al_2(SO_4)_3$ | 0.10 | 1.0 | 20 | 2.5 | 28 | 2 | 2 | 55 | >20 | >150 |
| C9 | 8.4 | $KAl(SO_4)_2$ | 0.21 | 2.1 | 20 | 2.5 | 28 | 11 | 2 | 48 | 137 | 89 |
| C10 | 6.0/ $H_2SO_4$ | $KAl(SO_4)_2$ | 0.15 | 1.5 | 20 | 3.6 | 30 | 4 | 1 | 50 | 135 | 85 |

If an acid (HCl, $H_2SO_4$) is indicated in column 2 of the above table, this means that the indicated pH was set by addition of this acid.

This series of examples shows that washing the crumb with deionized water only when $CaCl_2$ is used as precipitation electrolyte gives nitrile rubbers having a satisfactory storage stability. The storage-stable nitrile rubbers contain from 1235 to 1290 ppm of calcium.

Examples 11-20

Examples According to the Invention and Comparative Examples

Storage stability of the nitrile rubber (28.9% by weight of acrylonitrile) obtained from latex A under the coagulation and washing conditions indicated in the following table.

Washing of the crumb was in all cases carried out at 20° C. using either deionized water (DW) or water containing calcium ions (BW)

If an acid (HCl, $H_2SO_4$) is indicated in column 2 of the above table, this means that the indicated pH has been set by addition of this acid.

The series of experiments 2) shows that the use of undeionized and thus Ca-containing water (BW) in the washing of the crumb gives storage-stable nitrile rubbers. The use of deionized water (DW) in the washing of the crumb does not lead to nitrile rubbers having a satisfactory storage stability. The storage-stable nitrile rubbers of the invention contain Ca in amounts of from 490 to 890 ppm.

Examples 21-31

Examples According to the Invention

Storage stability of the nitrile rubber (28.9% by weight of acrylonitrile) obtained from latex A under the coagulation and washing conditions indicated in the following table.

The washing of the crumb was in all cases carried out using water containing calcium ions (BW).

| | | Coagulation of the latex | | | | Washing conditions | | | | | ML1 + 4 @100° C. [MU] | | |
|---|---|---|---|---|---|---|---|---|---|---|---|---|---|
| Example | pH of the latex | Type of salt | Conc. of the salt solution [% by weight] | Amount of salt based on NBR [% by weight] | T [° C.] | Type of water | Time [h] | Chlorine content [ppm] | Ca [ppm] | Mg [ppm] | MV1 | MV2 | SS |
| 11 | 6.0/ $H_2SO_4$ | NaCl/ DW | 7 | 70 | RT | BW | 7.75 | 110 | 805 | 25 | 48 | 48 | 0 |
| 12 | 6.0/ $H_2SO_4$ | NaCl/ BW | 7 | 70 | RT | BW | 7.75 | 85 | 850 | 27 | 48 | 51 | 3 |
| 13 | 6.0/ HCl | $MgCl_2$ | 0.8 | 8 | RT | BW | 5.0 | 51 | 755 | 230 | 47 | 48 | 1 |
| 14 | 6.0/ HCl | $MgCl_2$/ $CaCl_2$ | 0.8 | 7.6/0.4 | RT | BW | 5.0 | 52 | 890 | 170 | 51 | 46 | −5 |
| 15 | 6.0/ HCl | $MgCl_2$ | 0.8 | 8 | RT | BW | 5 | 53 | 725 | 225 | 43 | 45 | 2 |
| C16 | 6.0/ HCl | $MgCl_2$ | 0.8 | 8 | RT | DW | 5 | 36 | 10 | 225 | 40 | 59 | 19 |
| 17 | 6.0/ HCl | $MgCl_2$ | 1.6 | 16 | RT | BW | 5 | 88 | 750 | 265 | 44 | 46 | 2 |
| C18 | 6.0/ HCl | $MgCl_2$ | 1.6 | 16 | RT | DW | 5.0 | 39 | 15 | 255 | 41 | 58 | 17 |
| 19 | 9.5 | $MgCl_2$/ $CaCl_2$ | 0.8 | 8/0.4 | RT | BW | 5.0 | 49 | 490 | 106 | 45 | 48 | 3 |
| 20 | 9.5 | $MgCl_2$/ $CaCl_2$ | 0.8 | 8/0.4 | RT | BW | 2.5 | 62 | 540 | 121 | 43 | 45 | 2 |

| | | | Coagulation of the latex | | | | | | | | | ML1 + 4 @100° C. | | |
|---|---|---|---|---|---|---|---|---|---|---|---|---|---|---|
| | pH of | | Conc. of the salt solution | Amount of salt based on NBR | | Washing conditions | | Chlorine content | Ca | Mg | | [MU] | | |
| Example | the latex | Type of salt | [% by weight] | [% by weight] | T [° C.] | T [° C.] | Time [h] | [ppm] | [ppm] | [ppm] | MV1 | MV2 | SS |
| 21 | 8.4 | NaCl | 18 | 63 | 70 | RT | 2.5 | 240 | 610 | 21 | 47 | 47 | 0 |
| 22 | 8.4 | NaCl | 18 | 63 | 70 | RT | 10 | 170 | 560 | 24 | 48 | 47 | −1 |
| 23 | 8.4 | NaCl | 18 | 63 | 70 | RT | 5.0 | 220 | 705 | 19 | 46 | 49 | 3 |
| 24 | 8.4 | NaCl | 18 | 63 | 70 | RT | 15.0 | 230 | 645 | 18 | 48 | 48 | 0 |
| 25 | 8.4 | NaCl | 18 | 63 | 70 | 65 | 2.5 | 970 | 565 | 21 | 47 | 47 | −1 |
| 26 | 8.4 | $MgCl_2$ | 35 | 2.71 | RT | RT | 2.5 | 63 | 830 | 235 | 45 | 48 | 3 |
| 27 | 8.4 | $MgCl_2$ | 35 | 2.71 | 45 | 60 | 5.0 | 44 | 610 | 107 | 45 | 48 | 3 |
| 28 | 8.4 | $MgCl_2$ | 20 | 2.37 | 45 | 60 | 8 | 86 | 400 | 83 | 46 | 47 | 1 |
| 29 | 8.4 | $MgCl_2$ | 20 | 2.37 | 70 | 60 | 8 | 97 | 215 | 101 | 46 | 46 | 0 |
| 30 | 8.4 | $MgCl_2$ | 20 | 2.37 | 80 | 60 | 8 | 120 | 225 | 107 | 46 | 48 | 2 |
| 31 | 8.4 | $MgCl_2$ | 29 | 2.37 | 90 | 60 | 8 | 76 | 171 | 111 | 46 | 48 | 2 |

The series of examples 3) shows that variation of the conditions in the coagulation of the latex and in the washing of the crumb gives storage-stable nitrile rubbers having Ca contents in the range from 171 ppm to 830 ppm.

Examples 32-35

Examples According to the Invention

Storage stability of the nitrile rubber (18.8% by weight of acrylonitrile) obtained from latex B under the coagulation and washing conditions indicated in the following table.

The washing of the crumb was in all cases carried out using water containing calcium ions (BW).

| | | | Coagulation of the latex | | | | | | | | | ML1 + 4@100° C. | | |
|---|---|---|---|---|---|---|---|---|---|---|---|---|---|---|
| | pH of | | Conc. of the salt solution | Amount of salt based on NBR | | Washing conditions | | Chlorine content | Ca | | | [MU] | | |
| Example | the latex | Type of salt | [% by weight] | [% by weight] | T [° C.] | T [° C.] | Time [h] | [ppm] | [ppm] | | MV1 | MV2 | SS |
| 32 | 11.4 | NaCl | 26 | 64 | 90 | 60 | 8 | 220 | 180 | | 48 | 51 | 3 |
| 33 | 11.4 | $MgCl_2$ | 35 | 1.8 | 90 | 60 | 8 | 63 | 505 | | 46 | 50 | 4 |
| 34 | 11.4 | $CaCl_2$ | 10 | 1.63 | 90 | 60 | 8 | 73 | 1225 | | 47 | 4 | −3 |
| 35 | 11.4 | $MgCl_2$/ $CaCl_2$ | 35 | 1.08/0.12 | 90 | 60 | 8 | 43 | 350 | | 46 | 49 | 1 |

Example 36

Example According to the Invention

Storage stability of nitrile rubber (38.6% by weight of acrylonitrile) obtained from latex C under the coagulation and washing conditions indicated in the following table.

The washing of the crumb was carried out using water containing calcium ions (BW).

| Example | pH of the latex | Type of salt | Conc. of the salt solution [% by weight] | Amount of salt based on NBR [% by weight] | Washing T [°C] | T [°C] | time [h] | Chlorine content [ppm] | Ca [ppm] | ML1+4@100°C [MU] MV1 | MV2 | SS |
|---|---|---|---|---|---|---|---|---|---|---|---|---|
| 36 | 10.9 | $CaCl_2$ | 0.3 | 1.8 | 90 | 60 | 8 | 100 | 1930 | 47 | 51 | 4 |

What is claimed is:

1. A nitrile rubber which contains repeating units of at least one α,β-unsaturated nitrile and, at least one conjugated diene and
   (i) has a calcium content of 150 ppm to 1290 ppm, based on the nitrile rubber, and a chlorine content of at least 40 ppm, based on the nitrile rubber, and
   (ii) contains 2,2,4,6,6-pentamethylheptane-4-thio, 2,4,4,6,6-pentamethylheptane-2-thio, 2,3,4,6,6-pentamethylheptane-2-thio and 2,3,4,6,6-pentamethylheptane-3-thio end groups,
wherein the nitrile rubber has a storage stability of not more than 3 Mooney units, said storage stability calculated by the formula (I), $$\text{storage stability} = MV2 - MV1 \tag{I}$$

where MV1 is the Mooney viscosity of the nitrile rubber and MV2 is the Mooney viscosity of the same nitrile rubber after storage at 100 °C. for 48 hours.

2. The nitrile rubber according to claim 1 wherein said calcium content is 200 ppm to 1290 ppm based on the nitrile rubber.

3. The nitrile rubber according to claim 1 wherein said calcium content is 400 ppm to 1290 ppm based on the nitrile rubber.

4. The nitrile rubber according to claim 1 wherein said calcium content is 500 ppm to 1290 ppm based on the nitrile rubber.

5. The nitrile rubber according to claim 1 wherein said calcium content is 600 ppm to 1290 ppm based on the nitrile rubber.

6. The nitrile rubber according to claim 1 wherein said calcium content is 800 ppm to 1290 ppm based on the nitrile rubber.

7. The nitrile rubber according to claim 1 wherein the Mooney viscosity MV1 (ML (1+4 @ 100° C.)) is from 10 to 150 Mooney units.

8. The nitrile rubber according to claim 1, wherein the Mooney viscosity MV1 (ML (1+4 @ 100° C.)) is from 20 to 100 Mooney units.

9. The nitrile rubber according to claim 1 wherein the nitrile rubber has a glass transition temperature in the range from −70° C. to +10° C.

10. The nitrile rubber according to claim 1, wherein the nitrile rubber has a glass transition temperature in the range from −60° C. to 0° C.

11. The nitrile rubber according to claim 1 comprising repeating units of acrylonitrile and 1,3-butadiene.

12. The nitrile rubber according to claim 1 comprising repeating units of one or more α,β-unsaturated monocarboxylic or dicarboxylic acids, their esters or amides.

13. The nitrile rubber according to claim 12 comprising repeating units of one or more of an alkyl ester of an α,β-unsaturated carboxylic acid selected from the group consisting of methyl (meth)acrylate, ethyl (meth)acrylate, propyl (meth)acrylate, n-butyl (meth)acrylate, t-butyl (meth)acrylate, hexyl (meth)acrylate, 2-ethylhexyl (meth)acrylate, octyl (meth)acrylate, and lauryl (meth)acrylate.

14. A vulcanizable mixture comprising: at least one nitrile rubber according to claim 1 and at least one crosslinker.

15. A process for producing the vulcanizable mixture according to claim 14 comprising mixing the at least one crosslinker and the nitrile rubber comprising repeating units of at least one α,β-unsaturated nitrile and at least one conjugated diene and wherein said nitrile rubber
   (i) has a calcium content of 150 ppm to 1290 ppm, based on the nitrile rubber, and a chlorine content of at least 40 ppm, based on the nitrile rubber, and
   (ii) contains 2,2,4,6,6-pentamethylheptane-4-thio, 2,4,4,6,6-pentamethylheptane-2-thio, 2,3,4,6,6-pentamethylheptane-2-thio and 2,3,4,6,6-pentamethylheptane-3-thio end groups,
wherein the nitrile rubber has a storage stability of not more than 3 Mooney units, said storage stability calculated by the formula (I), $$\text{storage stability} = MV2 - MV1 \tag{I}$$

where MV1 is the Mooney viscosity of the nitrile rubber and MV2 is the Mooney viscosity of the same nitrile rubber after storage at 100° C. for 48 hours.

16. A process for producing a molding based on a hydrogenated nitrile rubber, comprising vulcanizing the vulcanizable mixture according to claim 14 via a shaping process.

17. A process for producing a molding based on a-the nitrile rubber according to claim 1, comprising:
   providing the nitrile rubber for molding, and
   molding the nitrile rubber, thereby, forming the molding.

18. The molding obtained by the process according to claim 17.

19. The molding according to claim 18, wherein said molding is an article selected from the group consisting of a seal, a cap, a hose, a diaphragm, an o-ring seal, a flat seal, a corrugated sealing ring, a sealing sleeve, a sealing cap, a dust protection cap, a plug seal, a thermal insulation hose (with or without addition of PVC), an oil cooler hose, an air intake hose, a servo control hose, and a pump diaphragm.

20. A process for producing the nitrile rubber according to claim 1 comprising:
   polymerizing, via emulsion polymerization, at least one α,β-unsaturated nitrile, at least one conjugated diene thereby forming a latex containing the nitrile rubber,
   coagulating the latex thereby forming a coagulated nitrile rubber, and
   washing said coagulated nitrile rubber thereby forming the nitrile rubber;
   wherein the emulsion polymerization is carried out in the presence of a mixture containing 2,2,4,6,6-pentamethylheptane-4-thiol, 2,4,4,6,6-pentamethylheptane-2- thiol, 2,3,4,6,6-pentamethylheptane-2-thiol and 2,3,4,6,6-pentamethylheptane-3-thiol;

wherein the coagulation step is performed using at least one salt selected from the group consisting of aluminium, calcium, magnesium, sodium, potassium and lithium salts;

wherein either a water-soluble calcium salt is present in the coagulation and/or the washing of the coagulated nitrile rubber is carried out using water containing calcium ions and a salt based on a chloride is present either during the emulsion polymerization, during the coagulation or during the washing;

wherein the nitrile rubber has a calcium content of 150 ppm to 1290 ppm, based on the nitrile rubber; and wherein the nitrile rubber has a storage stability of not more than 3 Mooney units, said storage stability calculated by the formula (I), $$\text{storage stability} = MV2 - MV1 \quad (I)$$

where MV1 is the Mooney viscosity of the nitrile rubber and MV2 is the Mooney viscosity of the same nitrile rubber after storage at 100° C. for 48 hours.

21. The process according to claim 20, wherein the emulsion polymerization is carried out batchwise or continuously in a cascade of stirred vessels.

22. The process according to claim 20, wherein one or more aging inhibitors are added to the latex containing the nitrile rubber either before or during coagulation.

23. The process according to claim 22, wherein the aging inhibitor is one or more phenolic aging inhibitors.

24. The process according to claim 20, wherein sodium chloride, potassium chloride, calcium chloride, magnesium chloride, sodium nitrate, potassium nitrate, sodium sulphate, potassium sulphate, sodium hydrogencarbonate, potassium hydrogencarbonate, sodium carbonate, potassium carbonate, aluminium sulphate, potassium aluminium sulphate (potassium alum), sodium aluminium sulphate (sodium alum), sodium acetate, calcium acetate or calcium formate is used for the coagulation of the latex.

25. The process according to claim 20, wherein the total amount of the salt or salts used for the coagulation of the latex is 0.5-200 parts by weight, per 100 parts by weight of nitrile rubber.

26. The process according to claim 20, wherein the total amount of the salt or salts used for the coagulation of the latex is 0.8-80 parts by weight, per 100 parts by weight of nitrile rubber.

27. The process according to claim 20, wherein the total amount of the salt or salts used for the coagulation of the latex is 1-50 parts by weight, per 100 parts by weight of nitrile rubber.

28. The process according to claim 20, wherein the latex has a solids concentration in the range from 1% to 40% by weight.

29. The process according to claim 20, wherein the latex has a solids concentration in the range from 5% to 35% by weight.

30. The process according to claim 20, wherein the latex has a solids concentration in the range from 15 to 30% by weight.

31. The process according to claim 20, wherein the coagulation is carried out at a temperature in the range from 10 to 100° C.

32. The process according to claim 20, wherein the coagulation is carried out at a temperature in the range from 20 to 90° C.

33. The process according to claim 20, wherein the washing of the coagulated nitrile rubber is carried out at a temperature in the range from 15 to 90° C.

34. The process according to claim 20, wherein the washing of the coagulated nitrile rubber is carried out at a temperature in the range from 20 to 80° C.

35. The process according to claim 20, wherein the obtained nitrile rubber is subsequently subjected either (i) to a metathetic degradation reaction, (ii) a metathetic degradation reaction and a subsequent hydrogenation, or (iii) only a hydrogenation reaction.

36. A hydrogenated nitrile rubber obtained by the process according to claim 35 and comprising 2,2,4,6,6-pentamethylheptane-4-thio-, 2,4,4,6,6-pentamethylheptane-2-thio-, 2,3,4,6,6-pentamethyl-heptane-2-thio and 2,3,4,6,6-pentamethylheptane-3-thio end groups.

* * * * *